Feb. 24, 1925.
C. R. HARLESS
1,527,360
COMBINED STOCK WATERER AND FEEDER
Filed March 3, 1924
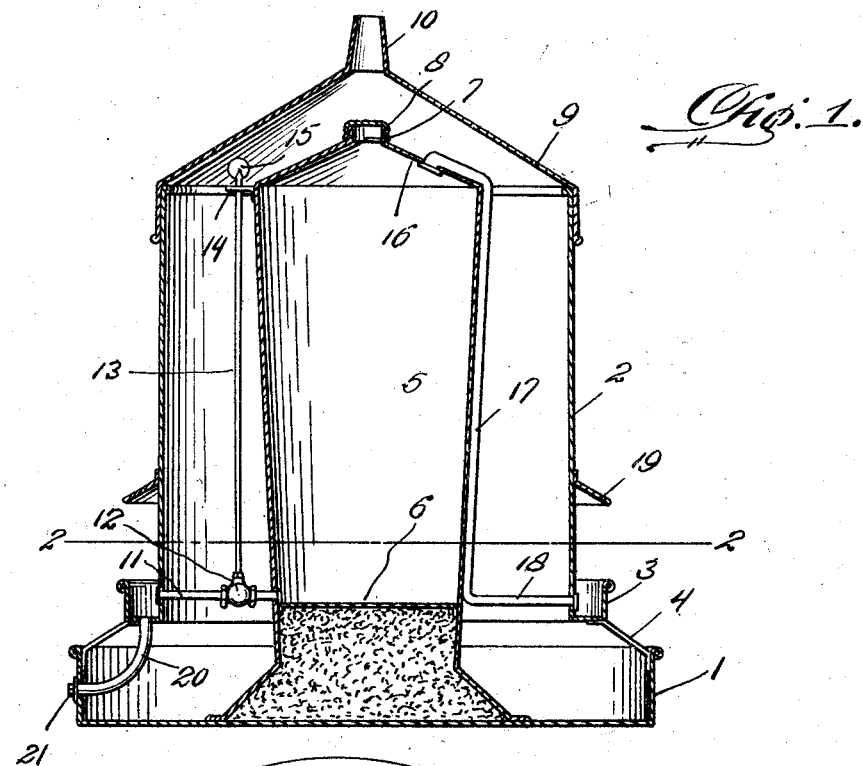
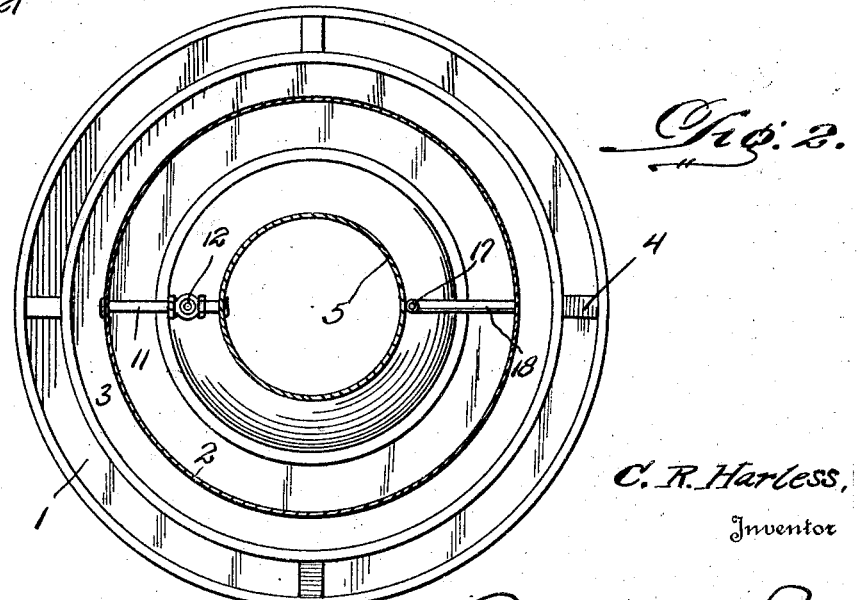
C. R. Harless,
Inventor Patented Feb. 24, 1925.

1,527,360

UNITED STATES PATENT OFFICE.

CHARLES R. HARLESS, OF BECKLEY, WEST VIRGINIA.

COMBINED STOCK WATERER AND FEEDER.

Application filed March 3, 1924. Serial No. 696,546.

*To all whom it may concern:*

Be it known that I, CHARLES R. HARLESS, a citizen of the United States, residing at Beckley, in the county of Raleigh and State of West Virginia, have invented certain new and useful Improvements in a Combined Stock Waterer and Feeder, of which the following is a specification.

This invention relates to new and useful improvements in stock waterers and feeders and has for its principal object to provide a simple and efficient device which will, at all times, contain a sufficient supply of feed and water and at all times accessible to the stock.

Another object of the invention is to provide a combined stock waterer and feeder wherein means is provided for draining off the water during the cold weather to prevent the freezing of the water in the drinking trough.

A simple object of the invention is to provide a device of the above mentioned character, wherein the closure for the feed hopper may also be used as a funnel for filling the water receptacle associated with my invention.

A further object of the invention is to provide a combined stock waterer and feeder of the above mentioned character, which is of such a construction as to obviate the necessity of a person having to constantly refill the hopper and the water receptacle as the feed and water are consumed.

A further object is to provide a device of the above mentioned character which is simple in construction, inexpensive, strong, and durable, and further well adapted for the purpose for which it is designated.

Other objects and advantages of this construction will become apparent during the course of the following description.

In the accompanying drawing, forming a part of the specification, and in which like numerals designate like parts throughout the same:

Figure 1 is a central vertical section of my improved stock waterer and feeder, and Figure 2 is a transverse section, taken on the line 2—2 of Figure 1.

In the drawing, wherein for the purpose of illustration is shown the preferred embodiment of my invention:

The numeral 1 designates the feed pan which is substantially circular in design, as clearly shown in Figure 2 of the drawing. Adapted to be supported about the cylindrical feed pan 1 is the cylindrical casing 2, which is open at both its upper and lower ends. The lower end of the casing 2 is flared outwardly and then upwardly to provide the drinking trough, at 3. In order to support the casing 2 and the drinking trough 3 carried thereby, in proper spaced relation with respect to the feed pan 1 so as to not interfere with the stock having access to the feed within the pan, I provide the braces 4. The latter are secured at their upper ends to the bottom of the drinking trough 3 and at their lower ends to the inner upper walls of the feed pan 1, and are arranged in proper spaced relation as is clearly shown in Figure 2.

Supported by the central portion of the feed pan 1 and adapted to extend centrally through the casing 2 is the water receptacle 5. The latter has its bottom 6 spaced from the bottom of the feed pan 1 and adapted to be placed in the space formed therebetween is the saw dust or the like for the purposes of preventing the dampness from the ground from coming in contact with the water within the receptacle 5. The upper portion of the water receptacle 5 is provided with the threaded neck 7, and normally held thereon is the closure cap 8. A closure 9 is also provided for the upper portion of the cylindrical casing 2 and this closure 9 is substantially conical shaped and terminates at its upper end into the spout 10, the purpose of which will hereinafter be more fully described.

Extending between the lower end of the water receptacle 5 and the water trough 3, is the outlet pipe 11. A suitable valve, such as is shown at 12 in the drawings, is disposed in the pipe 11, and for the purpose of controlling the same, I provide the rod 13 which extends partially within the casing 2 and is supported at its upper end in a suitable bracket 14 extending outwardly from the upper end of the water receptacle 5. A handle, such as is shown at 15 in the drawing, is mounted on the upper end of the elongated rod 13, whereby the valve 12 may be either closed or opened.

Extending from the top 16 of the water receptacle 5 along the outer face of the water receptacle 5 is the air pipe 17. The lower end of this pipe is directed outwardly as shown at 18 in the drawing and is adapted to communicate with the water trough 3 at a point diametrically opposite the outlet pipe 11 as is clearly shown in Figure 2 of the drawing. As the purpose of the air pipe 17 is well known in the art, it is not thought necessary to go further into detail relative to the same. Extending around the outer face of the cylindrical casing 2, directly above the water trough 3 is the baffle plate 19, the purpose thereof being to prevent any feed from falling into the water trough 3 when the feed pan 1 is being refilled, in the manner as described. Extending downwardly from the drinking trough 3 is the drain pipe 20, and the latter has its outlet end disposed through the upwardly extending wall of the feed pan 1, in the manner shown in Figure 1 of the drawing. A suitable closure, such as is shown at 21 is adapted to be placed in the outer end of the drain cock 20 for normally keeping the same closed.

Normally, with the parts arranged as shown in Figure 1 of the drawing, the casing 2 is filled with the feed and water fed by gravity through the feed pan 1, where the stock may readily have acess thereto at all times. The water in the trough 3 will also, at all times, be at a predetermined level thus obviating the necessity of a person having to manually control the supply of feed and water to the respective containers therefor. When it is desired to refill the feed pan 1, the closure 9 is removed from the upper end of the cylindrical casing 2, and feed is passed into the casing 2 around the water receptacle 5. When it becomes necessary to refill the water receptacle 5, the closure 9 is removed from the upper end of the casing 2, the screw cap 8 is also removed from the threaded neck 7 of the closure 16 of the water receptacle and by inverting the closure 9 so that the spout 10 will fit into the neck 7 of the water receptacle, the closure 9 will then form a funnel, whereby water may be poured into the water receptacle, without a possibility of the same falling onto the feed contained within the hopper or feed pan.

In cold weather, in order to prevent the water from freezing in the trough 3, the plug 21 is removed from the drain pipe 20, and any water which may be in the drinking trough will be caused to be discharged through the drain pipe and the valve 12 will be closed, thereby preventing any water from being discharged into the drinking trough.

It will thus be seen from the foregoing description, that a combined stock waterer and feeder has been provided wherein the same is of such a construction as at all times to provide a sufficient quantity of feed and water for use by the stock, and the simplicity of my device furthermore enables the same to be readily disassembled in order to have access to the desired parts and by further presenting a closure which may be used as a funnel, considerable expense is saved, and also loss of feed due to the water falling on the same, is eliminated.

While I have shown the preferred embodiment of my invention, it is to be understood that various changes in the size, shape, and arrangement of parts may be resorted to without departing from the spirit of the invention and the scope of the subjoined claim.

Having thus described my invention, what I claim as new is:

A watering and feeding device comprising a pan, a water receptacle mounted upon the central portion of the pan and extending above the upper edge thereof, upwardly disposed braces mounted at the edge of the pan, an annular trough mounted upon the braces and having its bottom spaced above the upper edge of the pan, a casing supported upon the intermediate portion of the trough and disposed over the receptacle and spaced from the same, a cover for the upper end of the casing having an opening at its center, the receptacle being provided at its top with an opening which registers with an opening in the cover, a pipe leading from the top of the receptacle and disposed between the receptacle and the casing and communicating with the trough through the side of the casing, a valve controlled pipe communicating at one end with the lower portion of the receptacle and at its other end with the trough through the side of the casing and an inclined plate mounted upon the exterior surface of the casing and disposed above the trough and spaced above the upper edge thereof.

In testimony whereof I affix my signature.

CHARLES R. HARLESS.